(12) United States Patent
Dolan

(10) Patent No.: US 7,083,030 B2
(45) Date of Patent: Aug. 1, 2006

(54) TORQUE TRANSFER COUPLING WITH MAGNETORHEOLOGICAL CLUTCH ACTUATOR

(75) Inventor: James P. Dolan, Manilus, NY (US)

(73) Assignee: Magna Drivetrain of America, Inc., Troy, MI (US)

(*) Notice: Subject to any disclaimer, the term of this patent is extended or adjusted under 35 U.S.C. 154(b) by 0 days.

(21) Appl. No.: 10/357,046

(22) Filed: Feb. 3, 2003

(65) Prior Publication Data

US 2004/0149534 A1 Aug. 5, 2004

(51) Int. Cl.
*B60K 17/34* (2006.01)
*F16D 27/115* (2006.01)

(52) U.S. Cl. ............... 192/35; 192/21.5; 192/54.5; 192/84.91; 180/249

(58) Field of Classification Search ........... 192/21.5, 192/35, 54.5, 70.23, 84.7, 84.91; 475/85, 475/150, 231; 180/247, 248, 249
See application file for complete search history.

(56) References Cited

U.S. PATENT DOCUMENTS

| | | | |
|---|---|---|---|
| 4,444,298 A | 4/1984 | Stangroom | |
| 4,895,236 A | 1/1990 | Sakakibara et al. | |
| 4,896,754 A | 1/1990 | Carlson et al. | |
| 5,007,513 A | 4/1991 | Carlson | |
| 5,147,252 A | 9/1992 | Mace et al. | |
| 5,322,484 A | 6/1994 | Reuter | |
| 5,323,871 A | 6/1994 | Wilson et al. | |
| 5,358,084 A | 10/1994 | Schramm | |
| 5,407,024 A | 4/1995 | Watson et al. | |
| 5,423,235 A | 6/1995 | Botterill et al. | |
| 5,730,531 A | 3/1998 | Pinkos et al. | |
| 5,779,013 A | 7/1998 | Bansbach | |
| 5,915,513 A | 6/1999 | Isley, Jr. et al. | |
| 6,183,386 B1 | 2/2001 | Duggan | |
| 6,318,531 B1 | 11/2001 | Usoro et al. | |
| 6,334,832 B1 | 1/2002 | Heravi et al. | |
| 6,412,618 B1 | 7/2002 | Stretch et al. | |
| 6,428,441 B1 * | 8/2002 | Hunt | 475/231 |
| 6,527,661 B1 * | 3/2003 | Leeper | 475/150 |
| 6,725,990 B1 * | 4/2004 | Bowen | 192/35 |
| 6,755,290 B1 * | 6/2004 | Dolan | 192/21.5 |
| 6,811,007 B1 * | 11/2004 | Dolan | 192/35 |

FOREIGN PATENT DOCUMENTS

| | | |
|---|---|---|
| JP | 60-1432 | 7/1985 |
| RU | SU0684211 | 9/1979 |
| RU | SU1434-177 A | 10/1986 |

* cited by examiner

*Primary Examiner*—Richard M. Lorence
(74) *Attorney, Agent, or Firm*—Harness, Dickey & Pierce P.L.C.

(57) ABSTRACT

A torque transfer mechanism is provided for controlling the magnitude of a clutch engagement force exerted on a multi-plate clutch assembly that is operably disposed between a first rotary and a second rotary member. The torque transfer mechanism includes an actuator having a first segment fixed for rotation with the first rotary member and a second segment having a screw thread formed thereon which is rotatably and slidably disposed within a chamber filled with magnetorheological fluid. An electromagnetic coil is disposed in proximity to the chamber and is selectively energized for varying the viscosity of the magnetorheological fluid so as to induce axial movement of the actuator for engaging the multi-plate clutch assembly.

20 Claims, 9 Drawing Sheets

TORQUE TRANSFER COUPLING WITH MAGNETORHEOLOGICAL CLUTCH ACTUATOR

FIELD OF THE INVENTION

The present invention relates generally to power transfer systems for controlling the distribution of drive torque between the front and rear drivelines of a four-wheel drive vehicle. More particularly, the present invention is directed to a power transmission device for use in motor vehicle driveline applications and having a magnetorheological clutch actuator that is operable for controlling actuation of a multi-plate friction clutch assembly.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. In contrast, drive torque is only delivered to the primary driveline when the lock-up clutch is released for establishing a two-wheel drive mode.

A modern trend in four-wheel drive motor vehicles is to equip the power transmission device with an adaptive transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch plate assembly. The clutch actuator can be a power-operated device that is actuated in response to the magnitude of an electric control signal sent from an electronic controller unit (ECU). Variable control of the control signal is typically based on changes in current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

Currently, a large number of on-demand transfer cases are equipped with an electrically-controlled clutch actuator that can regulate the amount of drive torque transferred to the secondary output shaft as a function of the value of the electrical control signal applied thereto. In some applications, the transfer clutch employs an electromagnetic clutch as the power-operated clutch actuator. For example, U.S. Pat. No. 5,407,024 discloses a electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, the transfer clutch can employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm that is operable for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

While many on-demand clutch control systems similar to those described above are currently used in four-wheel drive vehicles, a need exists to advance the technology and address recognized system limitations. For example, the size, weight and electrical power requirements of the electromagnetic coil or the electric motors needed to provide the described clutch engagement loads may make such system cost prohibitive in some four-wheel drive vehicle applications. In an effort to address these concerns, new technologies are being considered for use in power-operated clutch actuator applications such as, for example, magnetorheological clutch actuators. Examples of such an arrangement are described in U.S. Pat. Nos. 5,915,513 and 6,412,618 wherein a magnetorheological actuator controls operation of a ball-ramp unit to engage the clutch pack. While such an arrangement may appear to advance the art, its complexity clearly illustrates the need to continue development of even further defined advancement.

SUMMARY OF THE INVENTION

Thus, its is an object of the present invention to provide a power transmission device for use in a motor vehicle having a torque transfer mechanism equipped with a magnetorheological clutch actuator that is operable to control engagement of a multi-plate clutch assembly.

It is a further object of the present invention to provide a magnetorheological thrust cam operator and an electromagnet for use as the clutch actuator in a torque transfer mechanism.

As a related object, the torque transfer mechanism of the present invention is well-suited for use in motor vehicle driveline applications to control the transfer of drive torque between a first rotary member and a second rotary member.

According to a preferred embodiment, the torque transfer mechanism includes a magnetorheological clutch actuator which is operable for controlling the magnitude of clutch engagement force exerted on a multi-plate clutch assembly that is operably disposed between the first rotary member and a second rotary member. The magnetorheological clutch actuator includes a first thrust cam that is fixed for rotation with the first rotary member, a second thrust cam, a chamber filled with magnetorheological fluid communicating with at least one of the thrust cams, and an electromagnet which surrounds a portion of the chamber. In operation, activation of the electromagnet creates a magnetic flux field which travels through the magnetorheological fluid for proportionally increasing its viscosity, thereby creating drag which results in an axial separation force between the thrust cams. This axial separation force results in axial movement of the first thrust cam for exerting a clutch engagement force on the clutch pack, thereby transferring drive torque from the first rotary member to the second rotary member. Upon deactivation of the electromagnet, a return spring releases the clutch pack from engagement and acts to axially move the first thrust cam to a neutral position.

In accordance with one preferred embodiment, the chamber is defined between the first thrust cam and the second thrust cam. Further, the first and second thrust cams have corresponding first and second cam surfaces that are arranged to normally cause common rotation of the first and second thrust cams when the electromagnet is deactivated. Upon activation of the electromagnet, a reaction force is generated between the first and second cam surfaces for causing axial movement of the first thrust cam relative to the clutch pack for engaging the clutch pack.

In accordance with an alternative preferred embodiment, a recess is formed in a housing within which the second thrust cam is rotatably supported. The sealed chamber is defined between the recess and the second thrust cam. The viscosity of the magnetorheological fluid is controllably varied to induce a drag force on the second thrust cam for imparting the reaction force between the first and second thrust cams.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transmission devices for use in motor vehicle drivelines such as, for example, an on-demand clutch in a transfer case or in-line torque coupling, a biasing clutch associated with a differential assembly in a transfer case or a drive axle assembly, or as a shift clutch in a multi-speed automatic transmission. Thus, while the present invention is hereinafter described in association with particular arrangements for use in specific driveline applications, it will be understood that the construction/ applications shown and described are merely intended to illustrate embodiments of the present invention.

Figure 1:
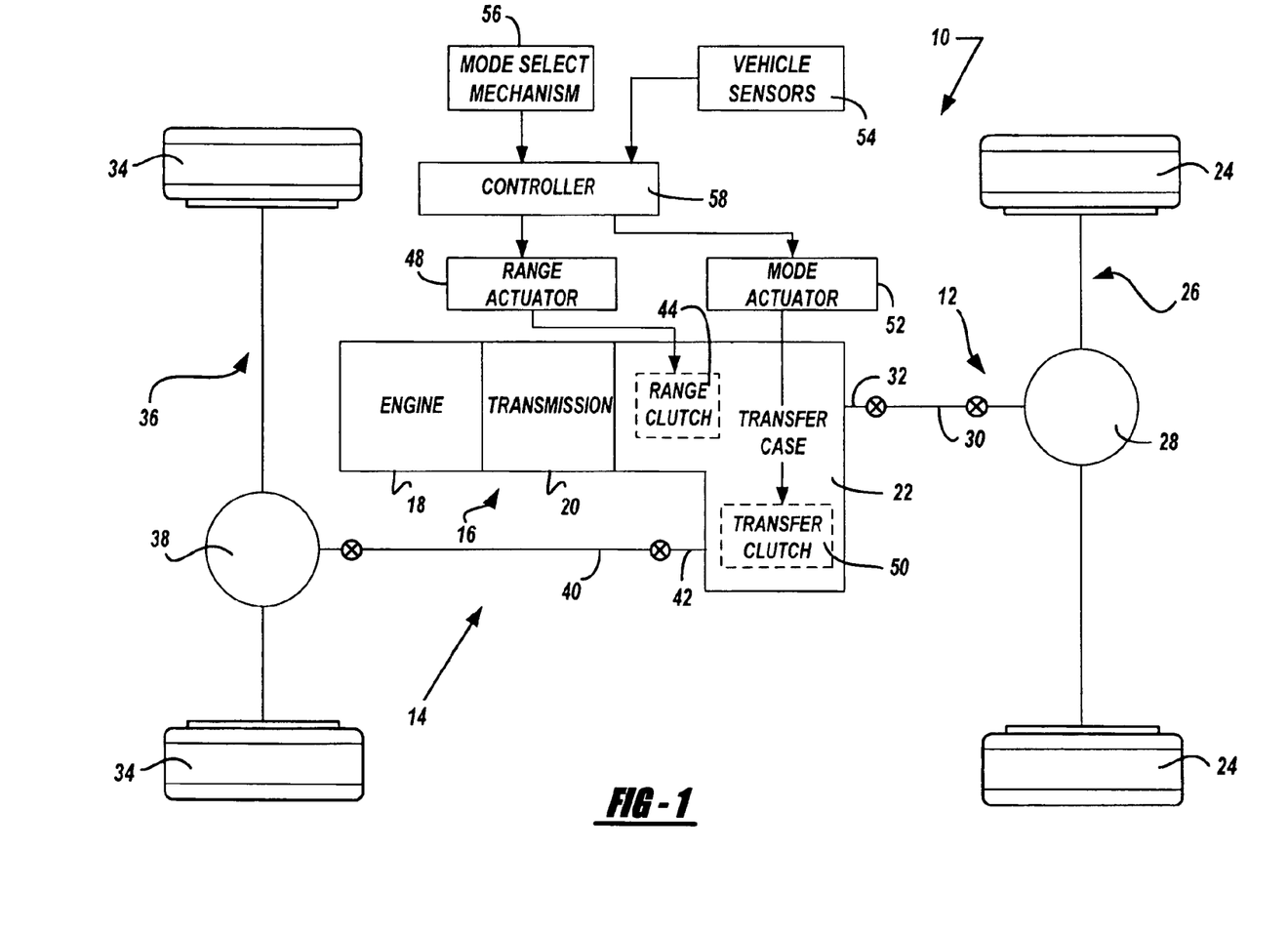
FIG. 1 illustrates the drivetrain of a four-wheel drive vehicle equipped with a power transmission device incorporating the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Front driveline 14 includes a pair of front wheels 34 connected at opposite ends of a front axle assembly 36 having a front differential 38 coupled to one end of a front prop shaft 40, the opposite end of which is coupled to a front output shaft 42 of transfer case 22.

With continued reference to the drawings, drivetrain 10 is shown to further include an electronically-controlled power transfer system for permitting a vehicle operator to select between a two-wheel high-range drive mode, a part-time four-wheel high-range drive mode, an on-demand four-wheel high-range drive mode, a neutral non-driven mode, and a part-time four-wheel low-range drive mode. In this regard, transfer case 22 is equipped with a range clutch 44 that is operable for establishing the high-range and low-range drive connections between an input shaft 46 and rear output shaft 32, and a power-operated range actuator 48 that is operable to actuate range clutch 44. Transfer case 22 also a transfer clutch 50 that is operable for transferring drive torque from rear output shaft 32 to front output shaft 42 for establishing the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of range actuator 48 and mode actuator 52 in response to input signals from vehicle sensors 54 and mode selector 56.

Figure 2:
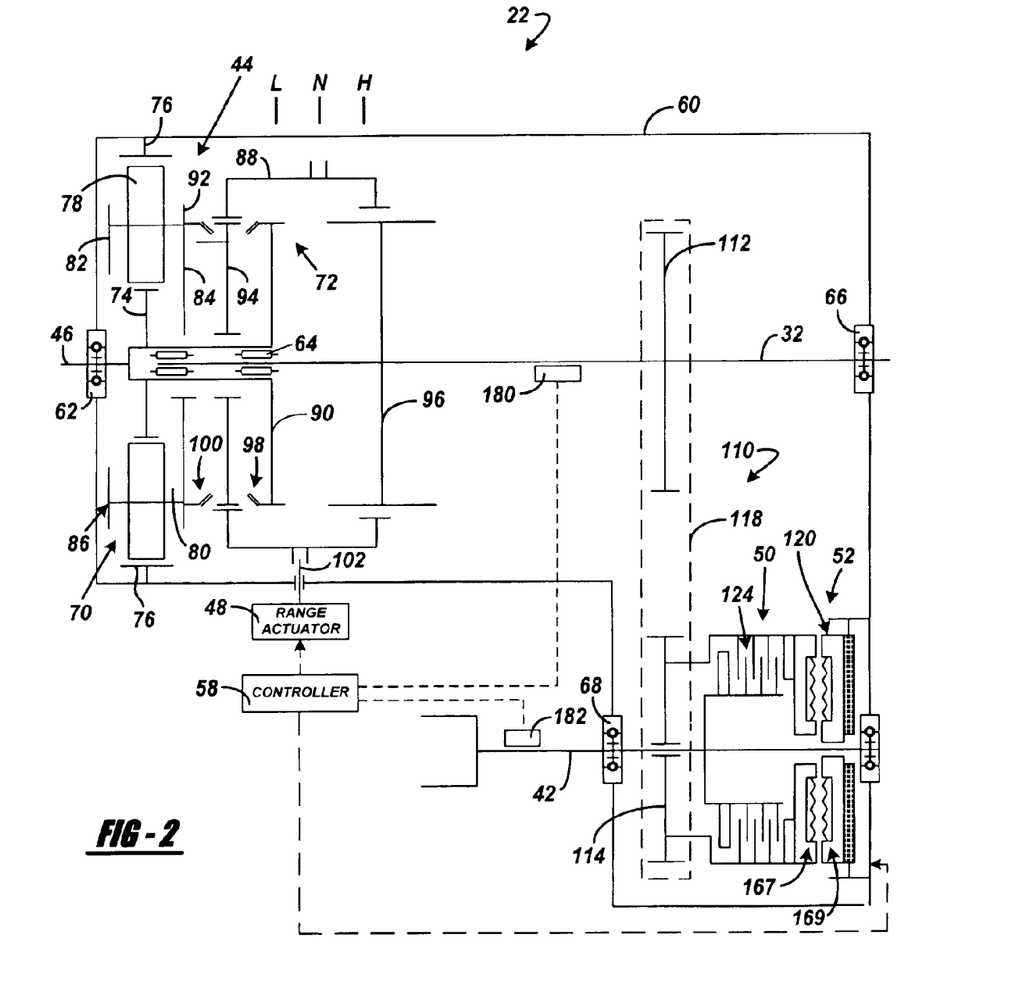
FIG. 2 is a schematic illustration of an on-demand 4WD transfer case equipped with a torque transfer mechanism having a magnetorheological clutch actuator and a multi-plate friction clutch.

Transfer case 22 is shown schematically in FIG. 2 to include a housing 60 from which input shaft 46 is rotatably supported by a bearing assembly 62. As is conventional, input shaft 46 is adapted for driven connection to the output shaft of transmission 20. Rear output shaft 32 is shown rotatably supported between input shaft 46 and housing 60 via bearing assemblies 64 and 66 while front output shaft 42 is rotatably supported between transfer clutch 50 and housing 60 by a pair of laterally-spaced bearing assemblies 68 and 69. Range clutch 44 is shown to include a planetary gearset 70 and a synchronized range shift mechanism 72. Planetary gearset 70 includes a sun gear 74 fixed for rotation with input shaft 46, a ring gear 76 fixed to housing 60, and a set of planet gears 78 rotatably supported on pinion shafts 80 extending between front and rear carrier rings 82 and 84, respectively, that are interconnected to define a carrier 86.

Planetary gearset 70 functions as a two-speed reduction unit which, in conjunction with a sliding range sleeve 88 of synchronized range shift mechanism 72, is operable to establish either of a first or second drive connection between input shaft 46 and rear output shaft 32. To establish the first drive connection, input shaft 46 is directly coupled to rear output shaft 32 for defining a high-range drive mode in which rear output shaft 32 is driven at a first (i.e., direct) speed ratio relative to input shaft 46. Likewise, the second drive connection is established by coupling carrier 86 to rear output shaft 32 for defining a low-range drive mode in which rear output shaft 32 is driven at a second (i.e., reduced) speed ratio relative to input shaft 46. A neutral non-driven mode is established when rear output shaft 32 is disconnected from both input shaft 46 and carrier 86.

Synchronized range shift mechanism 72 includes a first clutch plate 90 fixed for rotation with input shaft 46, a second clutch plate 92 fixed for rotation with rear carrier ring 84, a clutch hub 94 rotatably supported on input shaft 46 between clutch plates 90 and 92, and a drive plate 96 fixed for rotation with rear output shaft 32. Range sleeve 88 has a first set of internal spline teeth that are shown meshed with external spline teeth on clutch hub 94, and a second set of internal spline teeth that are shown meshed with external spline teeth on drive plate 96. As will be detailed, range sleeve 88 is axially moveable between three distinct positions to establish the high-range, low-range and neutral modes. Range shift mechanism 72 also includes a first synchronizer assembly 98 located between hub 94 and first clutch plate 90, and a second synchronizer assembly 100 disposed between hub 94 and second clutch plate 92. Synchronizers 98 and 100 work in conjunction with range sleeve 88 to permit on-the-move range shifts.

With range sleeve 88 located in its neutral position, as denoted by position line "N", its first set of spline teeth are disengaged from the external clutch teeth on first clutch plate 90 and from the external clutch teeth on second clutch plate 92. Thus, no drive torque is transferred from input shaft 46 to rear output shaft 32 when range sleeve 88 is in its neutral position. When it is desired to establish the high-range drive mode, range sleeve 88 is slid axially from its neutral position toward a high-range position, denoted by position line "H". First synchronizer assembly 98 is operable for causing speed synchronization between input shaft 46 and rear output shaft 32 in response to sliding movement of range sleeve 88 from its neutral position toward its high-range position. Upon completion of speed synchronization, the first set of spline teeth on range sleeve 88 move into meshed engagement with the external clutch teeth on first clutch plate 90 while its second set of spline teeth are maintained in engagement with the spline teeth on drive plate 96. Thus, movement of range sleeve 88 to its high-range position acts to couple rear output shaft 32 for common rotation with input shaft 46 and establishes the high-range drive mode connection therebetween.

Similarly, second synchronizer assembly 100 is operable for causing speed synchronization between carrier 86 and rear output shaft 32 in response to axial sliding movement of range sleeve 88 from its neutral position toward a low-range position, as denoted by position line "L". Upon completion of speed synchronization, the first set of spline teeth on range sleeve 88 move into meshed engagement with the external clutch teeth on second clutch plate 92 while the second set of spline teeth on range sleeve 88 are maintained in engagement with the external spline teeth on drive plate 96. Thus, with range sleeve 88 located in its low-range position, rear output shaft 32 is coupled for rotation with carrier 86 and the low-range drive mode connection is established between input shaft 46 and rear output shaft 32.

To provide means for moving range sleeve 88 between its three distinct range position, range shift mechanism 72 further includes a range fork 102 coupled to range sleeve 88. Range actuator 48 is operable to move range fork 102 for causing corresponding axial movement of range sleeve 88 between its three range positions. Range actuator 48 is preferably an electric motor arranged to move range sleeve 88 to a specific range position in response to a control signal from controller 58 that is based on the mode signal delivered to controller 58 from mode select mechanism 56.

It will be appreciated that the synchronized range shift mechanism permits "on-the-move" range shifts without the need to stop the vehicle which is considered to be a desirable feature. However, other synchronized and non-synchronized versions of range clutch 44 can be used in substitution for the particular arrangement shown. Also, it is contemplated that range clutch 44 and range actuator 48 can be removed entirely from transfer case 22 such that input shaft 46 would directly drive rear output shaft 32 to define a one-speed version of the on-demand transfer case embodying the present invention.

Figure 3:
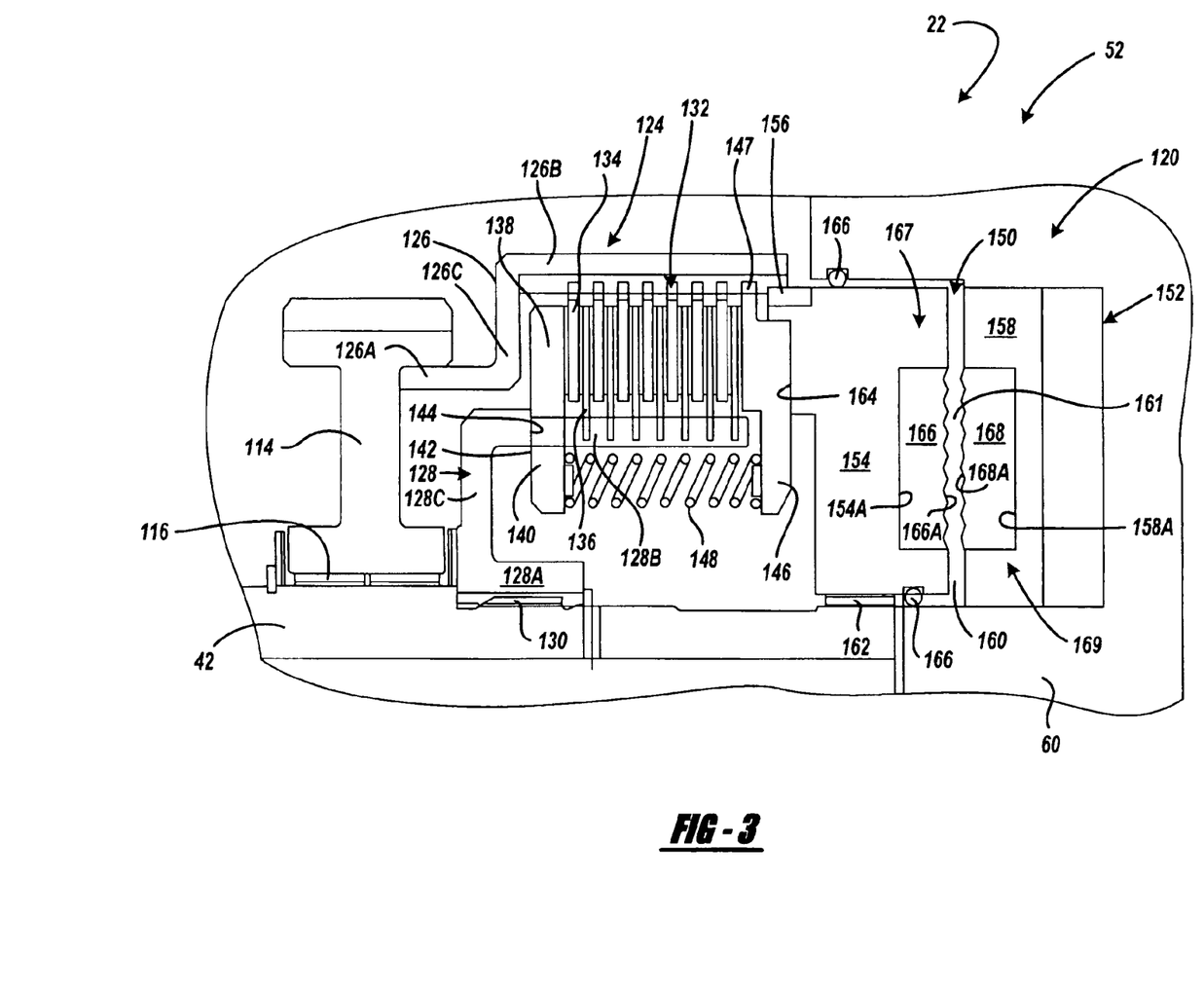
FIG. 3 is a partial sectional view of an the transfer case showing the torque transfer mechanism arranged for selectively transferring drive torque from the primary output shaft to the secondary output shaft.

Referring now primarily to FIGS. 2 and 3, transfer clutch 50 is shown arranged in association with front output shaft 42 in such a way that it functions to deliver drive torque from a transfer assembly 110 driven by rear output shaft 32 to front output shaft 42 for establishing the four-wheel drive modes. Transfer assembly 110 includes a first sprocket 112 fixed for rotation with rear output shaft 32, a second sprocket 114 rotatably supported by bearings 116 on front output shaft 42, and a power chain 118 encircling sprockets 112 and 114. As will be detailed, transfer clutch 50 is a multi-plate clutch assembly 124 and mode actuator 52 is a magnetorheological clutch actuator 120 which together define a torque transfer mechanism.

Multi-plate clutch assembly 124 is shown to include an annular drum 126 fixed for rotation with second sprocket 114, a hub 128 fixed via a splined connection 130 for rotation with front output shaft 42, and a multi-plate clutch pack 132 operably disposed between drum 126 and hub 128. In particular, drum 126 has a first smaller diameter cylindrical rim 126A that is fixed (i.e., welded, splined, etc.) to sprocket 114 and a second larger diameter cylindrical rim 126B that is interconnected to rim 126A by a radial plate segment 126C. Hub 128 is shown to include a first smaller diameter hub segment 128A and a second larger diameter hub segment 128B that are interconnected by a radial plate segment 128C. Clutch pack 132 includes a set of outer friction plates 134 that are splined to outer rim 126B of drum 126 and which are alternatively interleaved with a set of inner friction plates 136 that are splined to hub segment 128B of clutch hub 128. Clutch assembly 124 further includes a first pressure plate 138 having a plurality of circumferentially-spaced and radially-extending tangs 140 that are disposed in longitudinally-extending slots formed in hub segment 128B prior to installation of clutch pack 132 such that a front face surface 142 of each tang 140 abuts an end surface 144 of the slots so as to define a fully retracted position of first pressure plate 138 relative to clutch pack 132. Thus, first pressure plate 138 is coupled for common rotation with clutch hub 128 and front output shaft 42. A second pressure plate 146 is fixed via a splined connection 147 to rim 126B of drum 126 for rotation therewith. As seen, a plurality of circumferentially-spaced return springs 148 act between pressure plates 138 and 146.

With continued reference to FIGS. 2 and 3, magnetorheological clutch actuator 120 is shown to generally include a thrust cam operator 150 and an electromagnetic energy source such as, for example, electromagnetic coil 152. Thrust cam operator includes a drive ring 154 fixed via a spline connection 156 for rotation with drum 126 and a reaction ring 158 fixed to housing 60. Recesses 154A and 158A are formed in corresponding portions of drive ring 154 and reaction ring 158 and together define an annular chamber 160. Chamber 160 is filled with magnetorheological (MR) fluid 161, preferably of a high viscosity and of a type manufactured by Lord Corporation, Erie, Pa. Drive ring 154 is supported on front output shaft 42 via a bearing assembly 162 and has a front face surface 164 in engagement with second pressure plate 146. Seal rings 166 provide a fluid tight seal between chamber 160 and housing 60. As seen, a first cam disk 166 is secured within recess 154A such that it and drive ring 154 together define a first thrust cam 167.

Likewise, a second cam disk 168 is secured within recess 158A such that it and reaction ring 158 together define a second thrust cam 169. First cam disk 166 has a faceted face surface 166A communicating with MR fluid 161 in chamber 160. Similarly, second cam disk 168 has a faceted face surface 168A communicating with MR fluid 161 in chamber 160. The faceted face surfaces 166A, 168A are configured to include multiple angular and/or ramped portions of different sizes and shapes which act as cam surfaces.

Electromagnetic coil 152 is secured to housing and is adapted to receive electric control signals from controller 58 for generating a magnetic field. In the absence of a magnetic field, first thrust cam 167 rotates relative to second thrust cam 169 in chamber 160. However, when MR fluid 161 is exposed to a magnetic field upon activation of electromagnetic coil 152, its magnetic particles align with the field and increase the viscosity and, therefore, the shear strength of MR fluid 161. This increased shear strength causes the fluid to exert an axial separation force normal to the cam surfaces in the direction of relative rotation. Since second thrust cam 169 is axially restrained, the axial separation force causes first thrust cam 167 to move axially for forcibly urging second pressure plate 146 to move, in opposition to the biasing of springs 148, into engagement with clutch pack 132. Such engagement of clutch pack acts to transfer drive torque from rear output shaft 32 to front output shaft 42 through transfer mechanism 110. The magnitude of the axial separation force is proportional to the cam angles and geometry of the opposing cam surfaces and the viscosity of MR fluid 161.

The biasing force of springs 148 limits axial movement of first thrust cam 167 as a function of the viscosity of MR fluid 161. For example, in its least viscous form, MR fluid 161 has no effect and first thrust cam 167 rotates relative to second thrust cam 169 within chamber 160. In its most viscous form, MR fluid 161 has a large shear strength for inducing sufficient axial movement of first thrust cam 167 to fully engage clutch pack 132. However, axial movement of first thrust cam 167 is limited at full engagement of clutch pack 132 and once having achieved that limit, the thrust cams function only to circulate the now highly viscous MR fluid 161 within chamber 160. Degrees of viscosity are achievable between the least viscous and most viscous form of MR fluid 161 and vary with the intensity of the magnetic field and, thus, with the magnitude of the electric control signal sent to coil 152. As such, the value of the clutch engagement force induced by operator 150 and applied to clutch pack 132 of clutch assembly 124 can be adaptively varied as a function of the magnitude of the electric control signal sent to coil 152 between a no torque transfer condition (two-wheel drive mode with 100% of drive torque delivered to rear output shaft 32) and a torque-split condition (part-time four-wheel drive mode with 50% of drive torque to front output shaft 42 and 50% to rear output shaft 32). Upon decease of the magnetic field strength, first thrust cam 167 is axial biased by springs 148 against second pressure plate 146, thereby relieving engagement of clutch pack 132 and biasing first thrust cam 167 for movement to its released position.

In operation, when mode selector 56 indicates selection of the two-wheel high-range drive mode, range actuator 48 is signaled to move range sleeve 88 to its high-range position and transfer clutch 50 is maintained in a released condition with no electric signal sent to coil 150 of magnetorheological clutch actuator 120, whereby all drive torque is delivered to rear output shaft 32. If mode selector 56 thereafter indicates selection of a part-time four-wheel high-range mode, range sleeve 88 is maintained in its high-range position and a predetermined maximum electrical control signal is sent by controller 58 to coil 152 of magnetorheological clutch actuator 120 which causes axial movement of first thrust cam 167 due to the resultant change in viscosity of MR fluid 161. Such action causes second pressure plate 146 to engage clutch pack 132 until a maximum clutch engagement force is exerted on clutch pack 132 for effectively coupling hub 128 to drum 126. In response to such movement of second pressure plate 146, return springs 148 are compressed and act to forcibly locate first pressure plate 138 in its fully retracted position where it acts as a reaction plate against which clutch pack 132 is compressed.

If a part-time four-wheel low-range drive mode is selected, the operation of transfer clutch 50 and magnetorheological clutch actuator 120 are identical to that described above for the part-time high-range drive mode. However, in this mode, range actuator 48 is signaled to locate range sleeve 88 in its low-range position to establish the low-range drive connection between input shaft 46 and rear output shaft 32.

When the mode signal indicates selection of the on-demand four-wheel high-range drive mode, range actuator 48 moves or maintains range sleeve 88 in its high-range position and magnetorheological clutch actuator 120 is placed in a ready or "stand-by" condition. In particular, the amount of drive torque sent to front output shaft 42 through transfer clutch 50 with clutch actuator in its stand-by condition can be zero or a slight amount (i.e., in the range of 2–10%) as required for the specific vehicular application. This minimum stand-by torque transfer is generated by controller 58 sending a control signal to coil 152 having a predetermined minimum value. Thereafter, controller 58 determines when and how much drive torque needs to be transferred to front output shaft 42 based on tractive conditions and/or vehicle operating characteristics, as detected by vehicle sensors 54. For example, FIG. 2 illustrates a first speed sensor 180 which sends a signal to controller 58 indicative of the rotary speed of rear output shaft 32 while a second speed sensor 182 sends a signal indicative of the rotary speed of front output shaft 42. Controller 58 can vary the value of the electric control signal sent to coil 152 between the predetermined minimum value and the predetermined maximum value based on defined relationships or detected characteristics such as, for example, the speed difference ($\Delta$RPM) between shafts 32 and, 42, vehicle acceleration, a braking condition and the steering angle.

Figure 4:
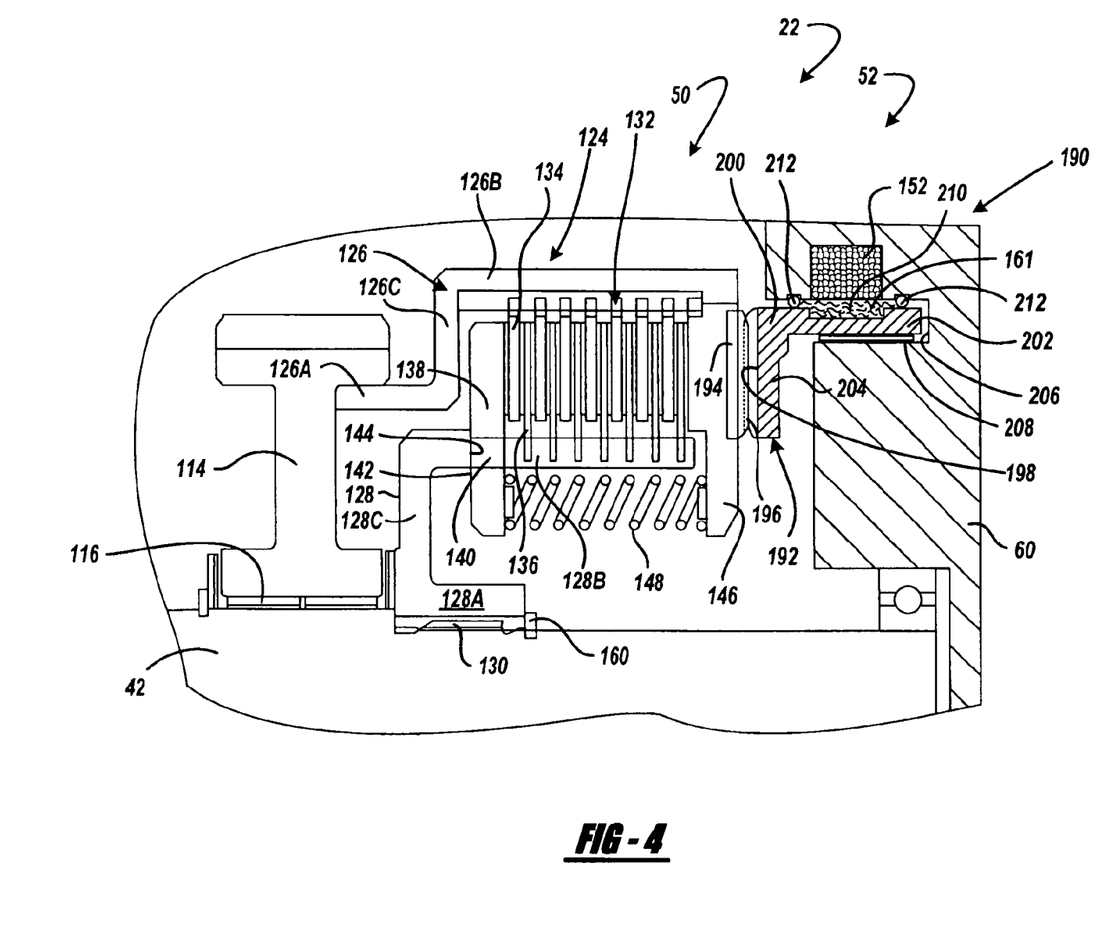
FIG. 4 is a partial sectional view of alternative embodiment of a torque transfer mechanism arranged for use in the transfer case of the present invention.

Referring now to FIG. 4, an alternative version of a torque transfer mechanism for use in transfer case 22 is shown. In particular, this torque transfer mechanism includes multi-plate clutch assembly 124 which is now associated with a different magnetorheological clutch actuator 190. For purposes of clarity and brevity, similar components are identified with common reference numerals throughout the drawings. Magnetorheological clutch actuator 190 is shown to generally include a brake operator 192 and an electromagnetic coil 152. Brake operator 192 includes a first thrust cam 194 fixed for rotation with second pressure plate 146 and having a surface defining a series of first cams 196 that are engaged or interdigitated with a series of second cams 198 formed on a surface of a second thrust cam 200. Second thrust cam 200 has an annular brake rotor 202 extending coaxially from its disk segment 204 and which is disposed for rotation in an annular cavity 206 formed in housing 60. A bearing assembly 208 rotatably supports rotor 202 from housing 60. Rotor 202 is formed with a circumferential recess in its outer surface that defines a fluid chamber 210 with an inner wall surface of housing 60 within cavity 206. A pair of laterally-spaced seal rings 212 are provided to seal chamber 210 which is filled with MR fluid 161. Coil 152 is secured in housing 60 and is located in proximity to chamber 210. As previously detailed, activation of coil 152 results in a magnetic field being established in MR fluid 151.

The profile of cams 196 and 198 are such that second thrust cam 200 rotates with first thrust cam 194 when MR fluid 161 has a low viscosity. Once an operating condition is detected that warrants actuation of the torque transfer mechanism, controller 58 sends an appropriate control signal to coil 152. This results in an increase in the shear strength of MR fluid 161 acting between housing 60 and rotor 202 of second thrust cam 200 which, in turn, exerts a reaction or brake torque on rotor 202. This braking of rotor 202 relative to housing 60 causes second thrust cam 200 to rotate relative to first thrust cam 194. As such, an axial separation force is applied to first thrust cam 194 which is proportional to the cam angle between cams 196 and 198 and the magnitude of the reaction torque exerted on rotor 202. This axial force then acts to cause second pressure plate 146 to exert a corresponding clutch engagement force on clutch pack 132, in opposition to the biasing force exerted thereon by return springs 148.

As previously disclosed, controller 58 cam vary the value of the electric control signal sent to electromagnetic coil 152 between predetermined minimum and maximum values based on defined relationships (ΔRPM), vehicle operating characteristics and/or the mode signal from mode selector 56 so as to establish any one of the available drive modes.

While both of the torque transfer mechanisms have been shown arranged on front output shaft 42, it is evident that they could easily be installed on rear output shaft 32 for selectively transferring drive torque to a transfer assembly coupled to drive front output shaft 42. Furthermore, the present invention can be used as a torque transfer coupling in an all-wheel drive (AWD) vehicle to selectively and/or automatically transfer drive torque on-demand from the primary (i.e., front) driveline to the secondary (i.e., rear) driveline. Likewise, in full-time transfer cases equipped with an interaxle differential, transfer clutch 50 could be used to limit slip and bias torque across the differential.

Figure 5:
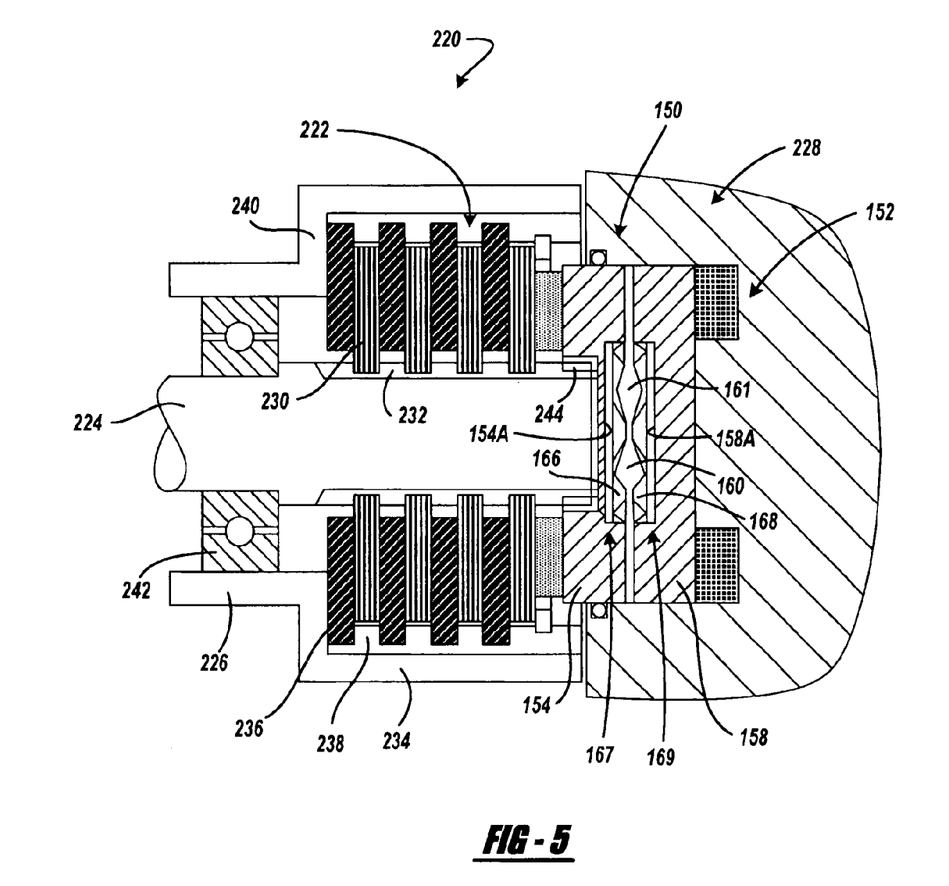
FIG. 5 is a modified version of the torque transfer mechanism shown in FIG. 3.

Referring now to FIG. 5, a torque transfer mechanism, hereinafter referred to as torque coupling 220, is shown to include a multi-plate clutch assembly 222 operably installed between an input member 224 and an output member 226, and a magnetorheological clutch actuator 228. Clutch assembly 222 includes a set of inner clutch plates 230 fixed via a spline connection 232 for rotation with input member 224, a clutch drum 234 fixed to output member 226, and a set of outer clutch plates 236 fixed via a spline connection 238 to clutch drum 234. As seen, outer clutch plates 236 are alternatively interleaved with inner clutch plates 230 to define a clutch pack. Drum 234 has a radial plate segment 240 which functions as a reaction plate against which the interleaved clutch plates can be frictionally engaged. A bearing assembly 242 is shown supporting drum 234 for rotation relative to input member 224.

Clutch actuator 228 is similar to clutch actuator 120 shown in FIG. 3 and includes a thrust cam operator 150 and electromagnetic coil 152. However, in this arrangement, drive ring 154 is fixed via a splined connection 244 to input member 224. Again, common reference numerals are used identified components of clutch actuator 228 that are similar to corresponding components of clutch actuator 120.

Figure 6:
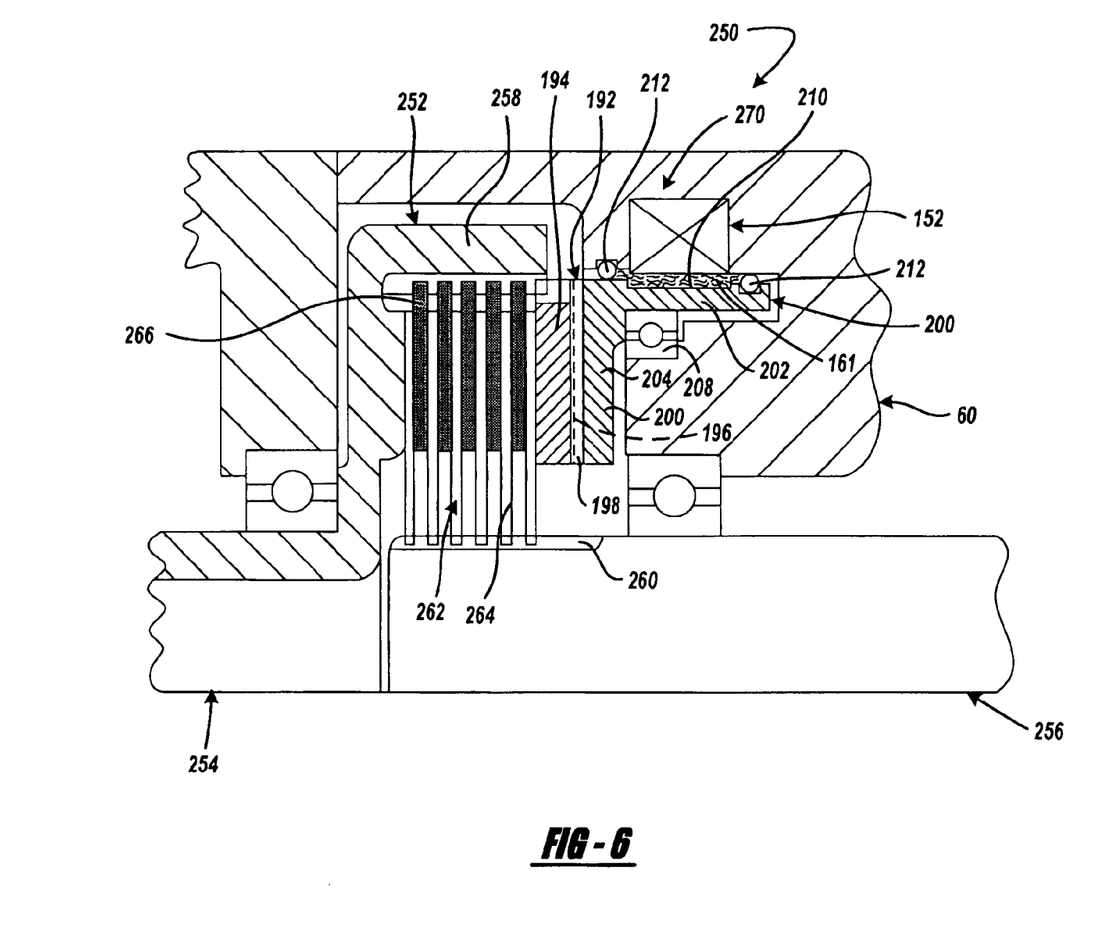
FIG. 6 is a modified version of the torque transfer mechanism shown in FIG. 4.

With reference to FIG. 6, an alternative torque transfer mechanism, hereinafter referred to as torque coupling 250, is shown to include a multi-plate clutch assembly 252 operably installed between a first rotary member 254 and a second rotary member 256. Clutch assembly 252 includes a clutch drum 258 fixed for rotation with first rotary member 254, a hub 260 associated with second rotary member 256 and a clutch pack 262. Clutch pack 262 includes inner clutch plates 264 splined to hub 260 and which are interleaved with outer clutch plates 266 splined to drum 258. Torque coupling 250 also includes a magnetorheological clutch actuator 270 that is similar to clutch actuator 190 shown in FIG. 4. Clutch actuator 270 includes brake operator 192 and electromagnetic coil 152. Operation of MR clutch actuator 270 is substantially similar to that of clutch actuator 190 in that activation of coil 152 brakes rotation of rotor 202 for causing axial movement of first thrust cam 194 for exerting a clutch engagement force on clutch pack 262. It is contemplated that torque couplings 220 and 250 could be readily used in various driveline applications including, without limitation, as the on-demand transfer clutch or the full-time bias clutch in 4WD transfer units, as an in-line coupling or power take-off unit, or as a limited slip coupling in drive axles and AWD systems.

Figure 7:
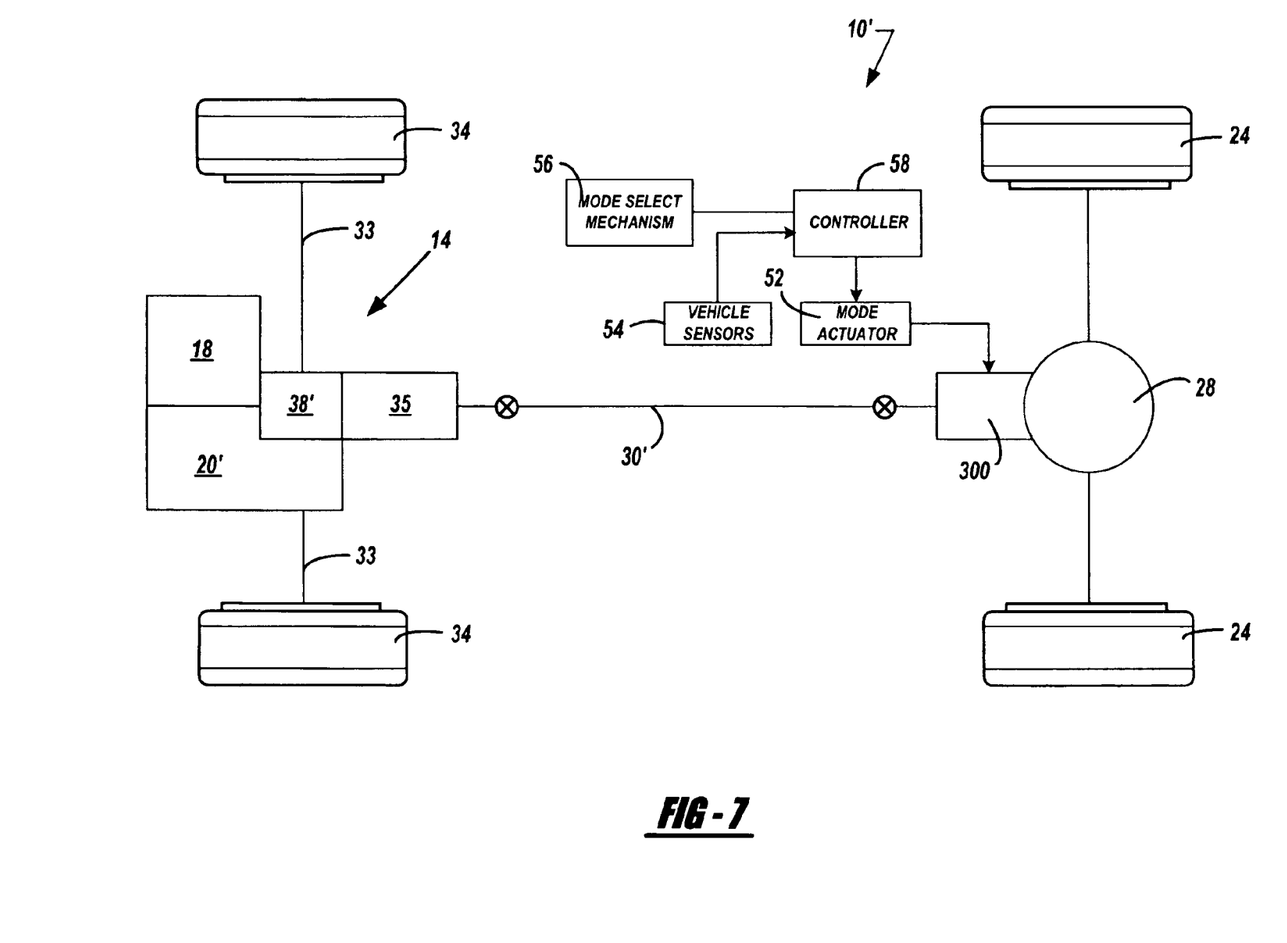
FIG. 7 is a schematic illustration of an alternative drivetrain for a four-wheel drive vehicle equipped with a power transmission device of the present invention.

To illustrate an alternative power transmission device to which the present invention is applicable, FIG. 7 schematically depicts a front-wheel based four-wheel drivetrain layout 10' for a motor vehicle. In particular, engine 18 drives a multi-speed transmission 20' having an integrated front differential unit 38' for driving front wheels 34 via axle shafts 33. A transfer unit 35 is also driven by transmission 20' for delivering drive torque to the input member of an in-line torque transfer coupling 300 via a drive shaft 30'. In particular, the input member of transfer coupling 300 is coupled to drive shaft 30' while its output member is coupled to a drive component of rear differential 28. Accordingly, when sensors indicate the occurrence of a front wheel slip condition, controller 58 adaptively controls actuation of torque coupling 300 such that drive torque is delivered "on-demand" to rear wheels 24. It is contemplated that torque transfer coupling 300 would include a multi-plate transfer clutch and a magnetorheological clutch actuator that are generally similar in structure and function to that of any of the devices previously described herein. While shown in association with rear differential 28, it is contemplated that torque coupling 300 could also be operably located for transferring drive torque from transfer unit 35 to drive shaft 30'.

Figure 8:
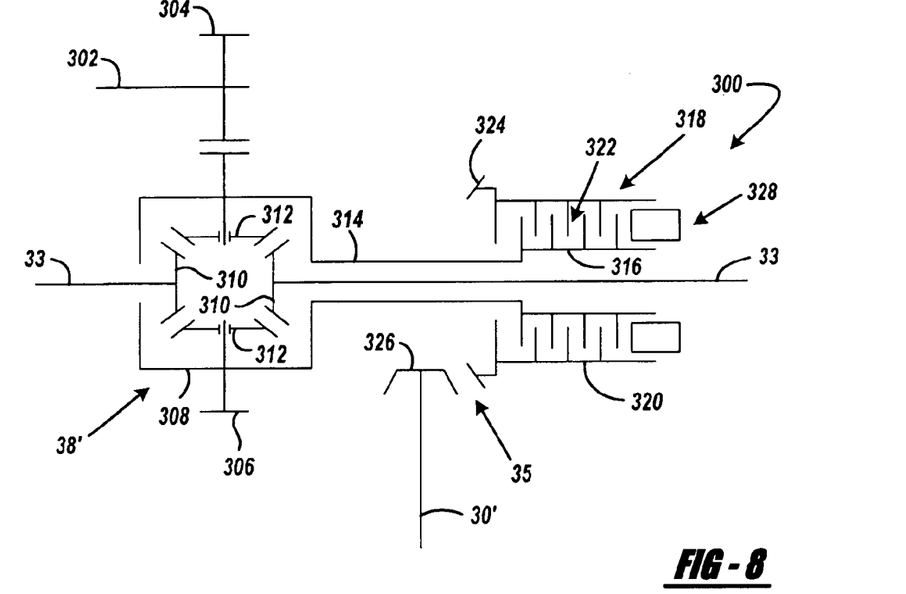
FIGS. 8 through 11 are schematic illustrations of alternative embodiments of the power transmission devices according to the present invention.

Referring now to FIG. 8, torque coupling 300 is schematically illustrated in association with an on-demand four-wheel drive system based on a front-wheel drive vehicle similar to that shown in FIG. 7. In particular, an output shaft 302 of transaxle 20' is shown to drive an output gear 304 which, in turn, drives an input gear 306 fixed to a carrier 308 associated with front differential unit 38'. To provide drive torque to front wheels 34, front differential unit 38' includes a pair of side gears 310 that are connected to front wheels 34 via axleshafts 33. Differential unit 38' also includes pinions 312 that are rotatably supported on pinion shafts fixed to carrier 308 and which are meshed with side gears 310. A transfer shaft 314 is provided to transfer drive torque from carrier 308 to a clutch hub 316 associated with a multi-pate clutch assembly 318. Clutch assembly 318 further includes a drum 320 and a clutch pack 322 having interleaved clutch plates operably connected between hub 316 and drum 320.

Transfer unit 35 is a right-angled drive mechanism including a ring gear 324 fixed for rotation with drum 320 of clutch assembly 318 which is meshed with a pinion gear 326 fixed for rotation with drive shaft 30'. As seen, a magnetorheological clutch actuator 328 is schematically illustrated for controlling actuation of clutch assembly 318. According to the present invention, magnetorheological actuator 328 can be similar to any one of the various magnetorheological clutch actuators previously described in that an electromagnetic coil is supplied with electric current for changing the viscosity of a magnetorheological fluid which, in turn, functions to control translational movement of a thrust cam for engaging clutch pack 322. In operation, drive torque is transferred from the primary (i.e., front) driveline to the secondary (i.e., rear) driveline in accordance with the particular mode selected by the vehicle operator via mode selector 56. For example, if the on-demand 4WD mode is selected, controller 58 modulates actuation of magnetorheological clutch actuator 328 in response to the vehicle operating conditions detected by sensors 54 by varying the value of the electric control signal sent to the electromagnetic coil. In this manner, the level of clutch engagement and the amount of drive torque that is transferred through clutch pack 322 to the rear driveline through transfer unit 35 and drive shaft 30' is adaptively controlled. Selection of a locked or part-time 4WD mode results in full engagement of clutch assembly 318 for rigidly coupling the front driveline to the rear driveline. In some applications, the mode selector 56 may be eliminated such that only the on-demand 4WD mode is available so as to continuously provide adaptive traction control without input from the vehicle operator.

Figure 9:
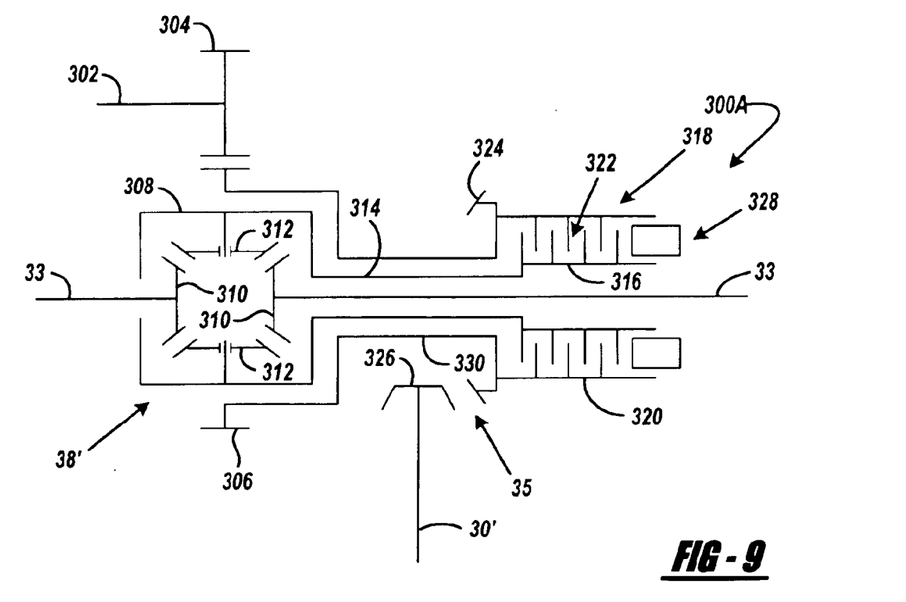

FIG. 9 illustrates a modified version of FIG. 8 wherein an on-demand four-wheel drive system is shown based on a rear-wheel drive motor vehicle that is arranged to normally deliver drive torque to rear wheels 24 while selectively transmitting drive torque to front wheels 34 through a torque coupling 300A. In this arrangement, drive torque is transmitted directly from transmission output shaft 302 to transfer unit 35 via a drive shaft 330 interconnecting input gear 306 to ring gear 324. To provide drive torque to front wheels 34, torque coupling 300A is now shown operably disposed between drive shaft 330 and transfer shaft 314. In particular, clutch assembly 318 is arranged such that drum 320 is driven with ring gear 324 by drive shaft 330. As such, actuation of magnetorheological clutch actuator 328 functions to transfer torque from drum 320 through clutch pack 322 to hub 316 which, in turn, drives carrier 308 of front differential unit 38' via transfer shaft 314. Again, the vehicle could be equipped with mode selector 56 to permit selection by the vehicle operator of either the adaptively controlled on-demand 4WD mode or the locked part-time 4WD mode. In vehicles without mode selector 56, the on-demand 4WD mode is the only mode available and which provides continuous adaptive traction control with input from the vehicle operator.

Figure 10:
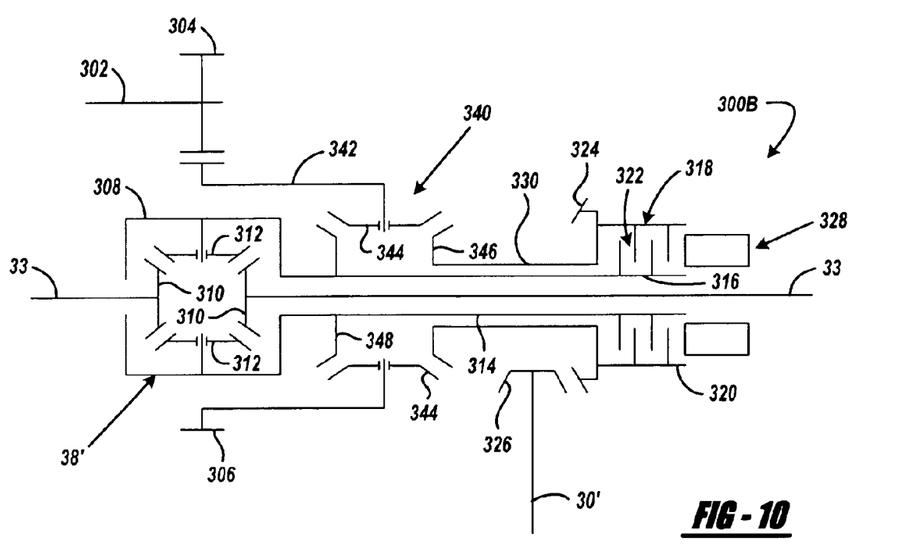

In addition to the on-demand 4WD systems shown previously, the power transmission (magnetorheological clutch actuator and clutch assembly) technology of the present invention can likewise be used in full-time 4WD systems to adaptively bias the torque distribution transmitted by a center or "interaxle" differential unit to the front and rear drivelines. For example, FIG. 10 schematically illustrates a full-time four-wheel drive system which is generally similar to the on-demand four-wheel drive system shown in FIG. 9 with the exception that an interaxle differential unit 340 is now operably installed between carrier 308 of front differential unit 38' and transfer shaft 314. In particular, output gear 306 is fixed for rotation with a carrier 342 of interaxle differential 340 from which pinion gears 344 are rotatably supported. A first side gear 346 is meshed with pinion gears 344 and is fixed for rotation with drive shaft 330 so as to be drivingly interconnected to the rear driveline through transfer unit 35. Likewise, a second side gear 348 is meshed with pinion gears 344 and is fixed for rotation with carrier 308 of front differential unit 38' so as to be drivingly interconnected to the front driveline. Torque transfer mechanism 300B is shown operably installed between side gears 346 and 348. In operation, when sensor 54 detects a vehicle operating condition, such as excessive interaxle slip, controller 58 adaptively controls activation of the electromagnetic coil associated with magnetorheological clutch actuator 328 for controlling engagement of clutch assembly 318, thereby adaptively controlling the torque biasing between the front and rear drivelines.

Figure 11:
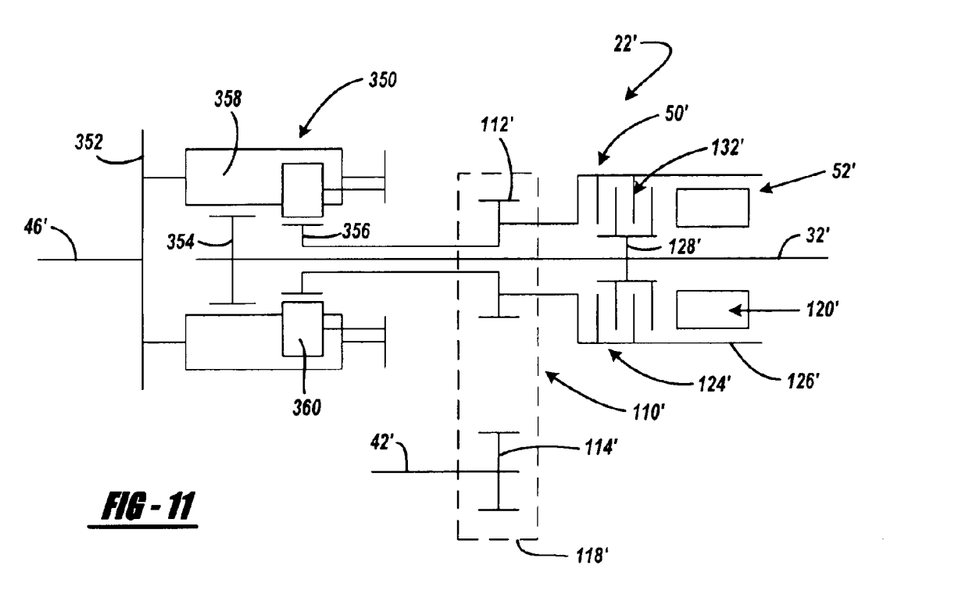

Referring now to FIG. 11, a full-time 4WD system is shown to include a transfer case 22' equipped with an interaxle differential 350 between an input shaft 46' and output shafts 32' and 42'. Differential 350 includes an input defined as a planet carrier 352, a first output defined as a first sun gear 354, a second output defined as a second sun gear 356, and a gearset for permitting speed differentiation between first and second sun gears 354 and 356. The gearset includes meshed pairs of first planet gears 358 and second pinions 360 which are rotatably supported by carrier 352. First planet gears 358 are shown to mesh with first sun gear 354 while second planet gears 350 are meshed with second sun gear 356. First sun gear 354 is fixed for rotation with rear output shaft 32' so as to transmit drive torque to rear driveline 12. To transmit drive torque to front driveline 14, second sun gear 356 is coupled to a transfer assembly 110' which includes a first sprocket 112' rotatably supported on rear output shaft 32', a second sprocket 114' fixed to front output shaft 42', and a power chain 118'.

Transfer case 22' further includes a biasing clutch 50' having a multi-plate clutch assembly 124' and a mode actuator 52' having a magnetorheological clutch actuator 120'. Clutch assembly 124' includes a drum 126' fixed for rotation with first sprocket 112', a hub 128' fixed for rotation with rear output shaft 32', and a multi-plate clutch pack 132' operably disposed therebetween. Magnetorheological clutch actuator 120' includes an electromagnetic coil that can be energized for controlling the viscosity of the magnetorheological fluid for controlling movement of a screw cam relative to clutch pack 132'.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
 a rotary input member adapted to receive drive torque from a source of torque;
 a rotary output member adapted to provide drive torque to an output device;
 a torque transfer mechanism operable for transferring drive torque from said input member to said output member, said torque transfer mechanism including a friction clutch assembly operably disposed between said input member and said output member and a magnetorheological clutch actuator operable for applying a clutch engagement force to said friction clutch assembly, said magnetorheological clutch actuator including a first thrust cam fixed for rotation with and axial movement relative to said input member and having a first cam surface, a second thrust cam having a second cam surface, a chamber formed between said first and second thrust cams in which said first and second cam surfaces are disposed and which is filled with magnetorheological fluid, and an electromagnetic coil arranged to vary the viscosity of the fluid in said chamber in response to electric control signals; and
 a controller for generating said electric control signals.

2. The power transmission of claim 1 wherein said second thrust cam and said electromagnetic coil are fixed to a housing such that said first thrust cam rotates relative to said second thrust cam.

3. The power transmission of claim 1 wherein said friction clutch assembly includes an interleaved clutch pack having a first set of clutch plates fixed for rotation with said input member and a second set of clutch plates fixed for rotation with said output member, and a pressure plate, and wherein axial movement of said first thrust cam causes said pressure plate to apply said clutch engagement force on said clutch pack.

4. The power transmission of claim 3 wherein said friction clutch assembly further includes a return spring for biasing said pressure plate to release said clutch pack.

5. The power transmission of claim 1 wherein said input member is a first output shaft of a transfer case and said output member is a second output shaft of said transfer case.

6. The power transmission of claim 1 wherein said controller establishes the value of said electric control signal based on a rotary speed difference between said input member and said output member, and wherein said control signal is operable to vary the viscosity of said magnetorheological fluid in said chamber for causing axial movement of said first thrust cam relative to said friction clutch assembly.

7. A transfer case for use in a motor vehicle having a powertrain and first and second drivelines, comprising:
  a first shaft driven by the powertrain and adapted for connection to the first driveline;
  a second shaft adapted for connection to the second driveline;
  a torque transfer mechanism operable for transferring drive torque from said first shaft to said second shaft, said torque transfer mechanism including an input member driven by said first shaft, an output member driving said second shaft, a friction clutch assembly operably disposed between said input member and said output member, and a clutch actuator operable for applying a clutch engagement force on said friction clutch assembly, said clutch actuator including a first thrust cam fixed for rotation with and axial movement relative to said input member and having a first cam surface, a second thrust cam having a second cam surface, a chamber formed between said first and second thrust cams such that said first and second cam surfaces are disposed in facing relationship and which is filled with magnetorheological fluid, and an electromagnetic coil arranged to vary the viscosity of the fluid in said chamber in response to electric control signals; and
  a controller for generating said electric control signals.

8. The power transmission of claim 7, wherein said second thrust cam and said electromagnetic coil are fixed to a housing such that said first thrust cam rotates relative to said second thrust cam.

9. The transfer case of claim 7 wherein said friction clutch assembly includes an interleaved clutch pack having a first set of clutch plates fixed for rotation with said input member and a second set of clutch plates fixed for rotation with said output member, and a pressure plate, and wherein axial movement of said first thrust cam causes said pressure plate to apply said clutch engagement force on said clutch pack.

10. The transfer case of claim 8 wherein said friction clutch assembly further includes a return spring for biasing said pressure plate to release said clutch pack.

11. The transfer case of claim 7 wherein said controller establishes the value of said electric control signal based on a rotary speed difference between said input member and said output member, and wherein said control signal is operable to vary the viscosity of said magnetorheological fluid in said chamber for causing axial movement of said first thrust cam relative to said friction clutch assembly.

12. A power transmission device for use in a motor vehicle having a powertrain and a driveline, comprising:
  an input driven by the powertrain;
  an output driving the driveline;
  a friction clutch operably disposed between said input and said output;
  a thrust cam operator including a first cam driven by said input and axially moveable for engaging said friction clutch, a second cam, and a chamber defined between said first and second cams which is filled with magnetorheological fluid;
  an electromagnetic energy source arranged to generate a magnetic field capable of varying the viscosity of said magnetorheological fluid in said chamber in response to electric control signals; and
  a control system for detecting certain operating characteristics of the motor vehicle and generating said electric control signals in response thereto, wherein variation of the fluid viscosity causes said first cam to move axially away from said second cam and into engagement with said friction clutch.

13. The power transmission device of claim 12 wherein said first cam includes an annular recess within which a first cam disk is disposed, said first cam disk having a faceted face surface in fluid communication with said magnetorheological fluid, and wherein said second cam includes an annular recess within which a second cam disk is disposed, said second cam disk having a faceted face surface in fluid communication with said magnetorheological fluid.

14. The power transmission device of claim 13 further comprising a biasing mechanism for normally locating said first cam in a released position when said electromagnetic energy source is deactivated, and wherein activation of said electromagnetic energy source causes a resultant change in the viscosity of said magnetorheological fluid which causes an axial separation force between said first and second cam disks to axially move said first cam toward an engaged position in opposition to the biasing of said biasing mechanism.

15. The power transmission device of claim 14 wherein said input is a driven shaft of a transfer case and said output is an output shaft coupled to the driveline, said friction clutch operable to transfer drive torque from said driven shaft to said output shaft for establishing a four-wheel drive mode in response to activation of said electromagnetic energy source.

16. A clutch actuator for controlling the magnitude of a clutch engagement force exerted on a clutch pack that is operably disposed between a first rotary member and a second rotary member, comprising:
  a first thrust cam fixed for rotation with the first rotary member;
  a second thrust cam disposed adjacent to said first thrust cam;
  a magnetorheological fluid disposed in a chamber defined between said first and second thrust cams; and
  an electromagnetic coil that can be selectively energized for varying the viscosity of said magnetorheological fluid to correspondingly vary a reaction force between said first and second thrust cams, thereby imparting relative axial movement of said first thrust cam for initiating engagement of said clutch pack.

17. The clutch actuator of claim 16 further comprising first and second cam surfaces respectively associated with said first and second thrust cams, said reaction force acting upon said first and second cam surfaces for imparting relative axial movement of said first thrust cam.

18. The clutch actuator of claim 16 wherein said second thrust cam is fixed from rotation.

19. A power transmission device comprising:
  a rotary input member adapted to receive drive torque from a power source;

a first rotary output member adapted to provide drive torque to a first output device;

a second rotary output member adapted to provide drive torque to a second output device;

a differential operably interconnecting said input member to said first and second output members;

a torque transfer mechanism operable for limiting speed differentiation between said first and second output members, said torque transfer mechanism including a friction clutch assembly operably disposed between said first output member and said second output member and a magnetorheological clutch actuator operable for applying a clutch engagement force to said friction clutch assembly, said magnetorheological clutch actuator including a first cam driven by said first output member and having a first cam surface, a second cam having a second cam surface facing said first cam surface, a chamber formed between said first and second cam surfaces that is filled with a magnetorheological fluid, and an electromagnet capable of varying the viscosity of said magnetorheological fluid in said chamber for causing axial movement of said first cam relative to said friction clutch assembly in response to electric control signals; and a control system for detecting an operational characteristic of the motor vehicle and generating said electric control signals in response thereto.

20. The power transmission of claim 19 wherein said input member is an input shaft of a transfer case, said first output member is a first output shaft of said transfer case, and said second output member is a second output shaft of said transfer case, and wherein said differential operably interconnects said input shaft to said first and second output shafts.

* * * * *